(12) United States Patent
Venugopal (10) Patent No.: US 7,493,194 B2
(45) Date of Patent: Feb. 17, 2009

(54) METHOD AND SYSTEM FOR ACHIEVING FORCE CONTROL IN EXTERNALLY DRIVEN HYDRAULIC CYLINDERS

(76) Inventor: Ravinder Venugopal, 1804 Tupper, #4, Montréal, Québec (CA) H3H 1N4

( * ) Notice: Subject to any disclaimer, the term of this patent is extended or adjusted under 35 U.S.C. 154(b) by 444 days.

(21) Appl. No.: 11/243,225

(22) Filed: Oct. 4, 2005

(65) Prior Publication Data

US 2007/0239412 A1    Oct. 11, 2007

(51) Int. Cl.
*G05D 7/00* (2006.01)

(52) U.S. Cl. ............... 700/282; 700/30; 700/31; 700/52; 700/78; 702/45

(58) Field of Classification Search .......... 700/30, 700/31, 45, 52, 78, 282, 283, 285; 702/45, 702/47; 703/9
See application file for complete search history.

(56) References Cited

U.S. PATENT DOCUMENTS

| | | | | |
|---|---|---|---|---|
| 3,665,809 | A * | 5/1972 | Walker et al. | 91/363 A |
| 4,653,300 | A * | 3/1987 | Crout et al. | 72/19.9 |
| 4,904,115 | A * | 2/1990 | Lebreton | 405/143 |
| 5,339,665 | A | 8/1994 | Yoshikawa | |
| 6,148,677 | A * | 11/2000 | Evangelista | 73/861.02 |
| 6,208,739 | B1 | 3/2001 | Venugopal et al. | |
| 6,732,033 | B2 | 5/2004 | LaPlante et al. | |
| 7,096,093 | B1 * | 8/2006 | Hansen et al. | 700/282 |

OTHER PUBLICATIONS

"RCS Based Hardware in-the-loop Intelligent System Design and Performance Measurement" by S. Anantha Krishnan, S. Agrawal, R. Venugopal and M. Demeri, in Proceedings of Per MIS 2002, NIST, Gaithersburg, MD, 2002, published in Aug. 2002, pp. 11-20.
"A Semiactive Vibration Absorber (SAVA) for Automotive Suspensions", by C. Mo and M. Sunwoo in Int. J. of Vehicle Design, pp. 83-95, vol. 29, Nos. 1/2, 2002, published in Jan. 2002.
Digital Control of Dynamic Systems, by G.F. Franklin, J.D. Powell and M.L. Workman, second edition ISBN No. 1-201-11938-2, Reading Mass: Addison Wesley, pp. 368, 369 of Chapter 8, published in 1990.

* cited by examiner

*Primary Examiner*—Sean P Shechtman
(74) *Attorney, Agent, or Firm*—Rama B Nath (57) ABSTRACT

A method/system for achieving force control in externally driven hydraulic/gas-filled cylinders estimates effective flow parameters based on sensor measurements, and predicts desired flow parameters for force control objectives and determines required control actuation signals. The system selectively uses pressure sensors to measure the pressure of fluid in each (hydraulic) cylinder, displacement sensors to measure the displacement of the piston in each (hydraulic) cylinder, piston velocity sensors or piston velocity estimators, manifold pressure sensors or manifold pressure estimators, converters that digitize analog signals from the sensors, a microprocessor capable of storing data from the converters and producing actuator signals, and flow regulating actuators responsive to the actuator signals for regulating the flow of (hydraulic) fluid out of each cylinder by changing the effective flow-area of flow ports. The invention can be used in hydraulic or gas-filled cylinder arrangements applied to die-cushions in stamping presses and active/semi-active shock absorbers.

11 Claims, 5 Drawing Sheets

FIG 1

Prior Art

FIG 2

Prior Art

METHOD AND SYSTEM FOR ACHIEVING FORCE CONTROL IN EXTERNALLY DRIVEN HYDRAULIC CYLINDERS

FIELD OF THE INVENTION

This invention generally relates to hydraulic systems for applying controlled forces on objects in various applications. More particularly, the invention relates to achieving force control in hydraulic cylinders driven by external mechanisms with unknown parameters.

BACKGROUND OF THE INVENTION

Figure 2:
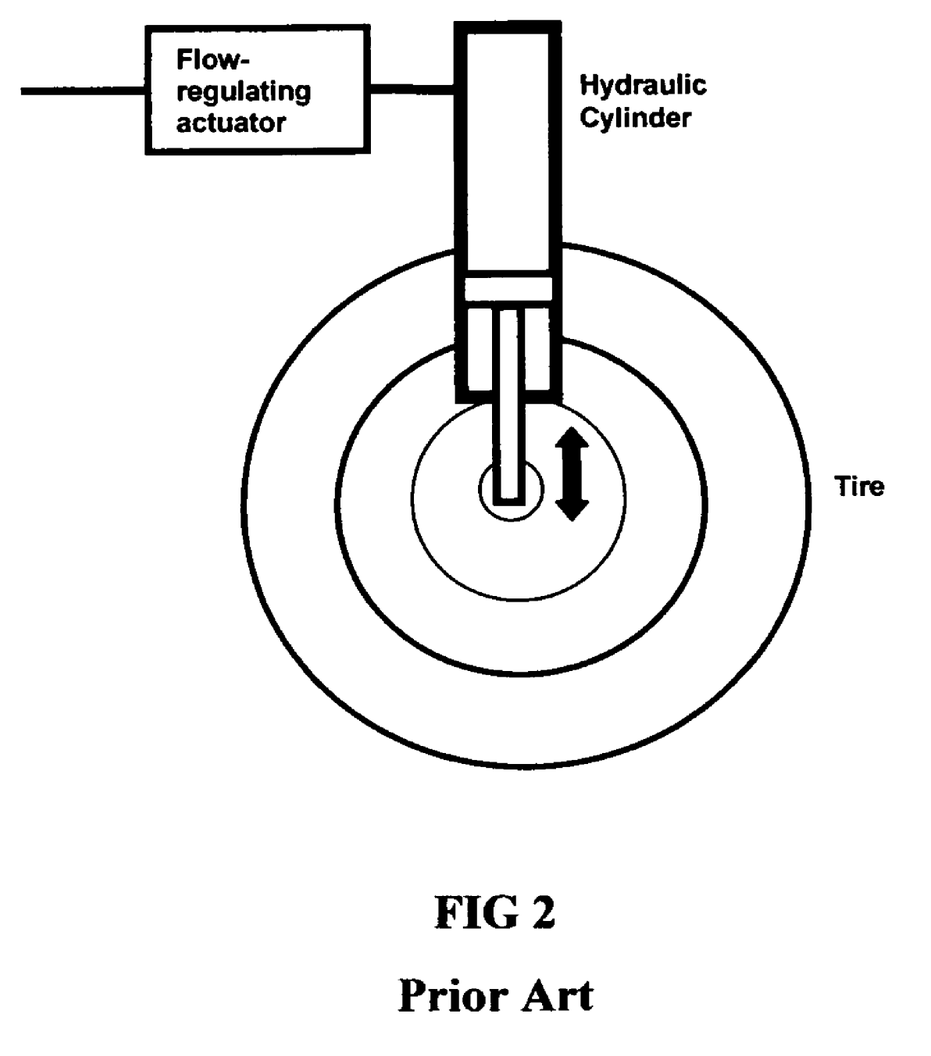
FIG. 2 illustrates a graphical representation of the system to be controlled according to an embodiment of the invention, in use as an active vehicle suspension device.
Figure 3:
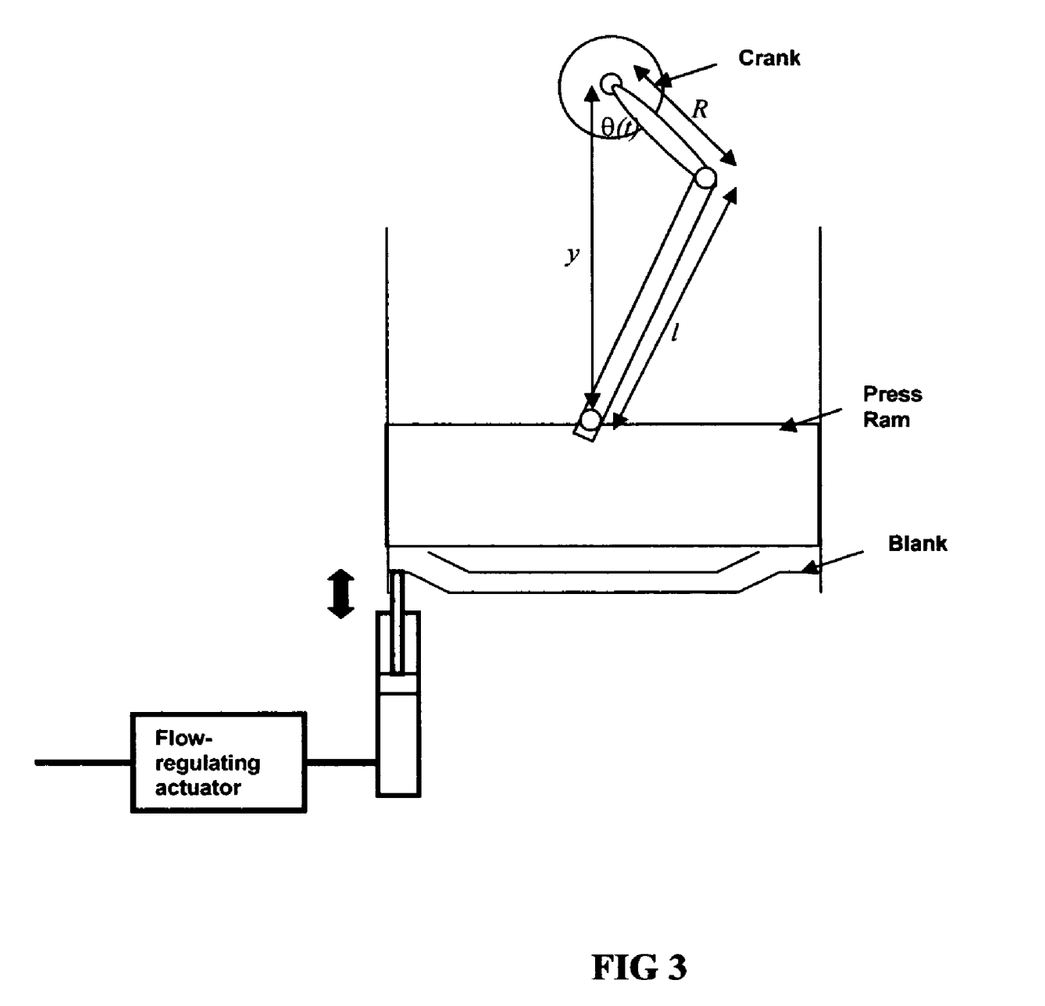
FIG. 3 illustrates a graphical representation of the system to be controlled using one form of the invention, in use as a variable blank-holder force device in a mechanical stamping press.

Force control in hydraulic systems is typically achieved by regulating the pressure of hydraulic fluid in a cylinder under the head of the piston by varying the flow of hydraulic fluid from or to a manifold using a flow-regulating mechanism such as a valve. In many cases, the pistons of the hydraulic cylinders are driven by external mechanisms. This arrangement is shown in a generic form in FIG. 1. One example of such an arrangement is an active or semi-active shock absorber in a vehicle in which the piston of a hydraulic cylinder is actuated by road forces acting on the wheel, and the cylinder is required to transfer a specific force to the vehicle body in order to maintain ride quality. FIG. 2 shows how such a system is essentially configured. Another example of an externally driven system is a hydraulic cushion system used to vary the blank-holder forces in the manufacture of sheet metal stamped parts, in which the configuration includes a set of hydraulic cylinders, which are placed in the tooling or in the bed of the press, and driven by the ram of the press during the stamping operation with the objective of delivering specific forces to the sheet metal blank at specific instances during the operation. FIG. 3 shows an example of such a configuration.

Heretofore, known force-control methods required setting of control parameters based on specific dynamic and kinematic characteristics of the driving mechanism. In particular, the gains of standard proportional-integral-derivative (PID) controllers were set for the specified mechanism, along with other hydraulic components such as pre-filled valves that compensate for various effects such as variable flow-rate. For example, the integral gain of the controller in U.S. Pat. No. 5,339,665 to Yoshikawa is adjusted based on a priori information on the drive-speed of the press, which is manually put in as the number of strokes-per-minute (SPM) into the memory of the controller. Even advanced control techniques such as those described in the publication by S. Ananthakrishnan, S. Agrawal, R. Venugopal, M. Demeri, titled "RCS Based Hardware-in-the-loop Intelligent System Design and Performance Measurement," *Proceedings of PerMIS* 2002, NIST, Gaithersburg, Md., 2002, require controller parameters to be set for the driving mechanism. Controllers for systems described in U.S. Pat. No. 6,732,033 of May 2004 to Laplate et al, and the publication by C. Mo and M. Sunwoo, titled "A Semiactive Vibration Absorber (SAVA) for Automotive Suspensions," *Int. J. of Vehicle Design*, pp. 83-95, Vol. 29, Nos. 1/2, 2002, are also based on knowing certain parameters such as the mass and acceleration profiles of the driving system. Thus, known externally driven hydraulic force control systems were customized and could not be easily reconfigured for use with a different external driving mechanism. The ability to use a single method and system to achieve force control in hydraulic cylinders driven by a wide range of external mechanisms provides a significant improvement in the state-of-the-art by widening the range of applications of such systems. For example, reconfigurable blank-holder force variation systems can be developed for use in a variety of presses, tools and dies, with as many cylinders as required, and these systems will not require recalibration of control parameters and customization of hydraulic components by skilled specialists. For example, such a system would also allow for achieving precise force control in active shock absorbers for a variety of vehicle and operating conditions.

Despite the need for a method and system that can adapt to varying driving mechanisms, no effective and efficient method is so far known. Thus, there is a need for a method and system for achieving force control in a multiplicity of hydraulic cylinders driven by external mechanisms with unknown parameters.

SUMMARY OF THE INVENTION

The present invention discloses a method and system for achieving force control in externally driven hydraulic systems in which the characteristics of the driving mechanism are not known. The disclosed method and system are applicable to a wide class of force control problems in hydraulic systems with variable flow rates induced by external mechanisms, including but not limited to hydraulic cylinders.

The present method does not require that the control parameters be manually adjusted for a particular external driving mechanism. In one form, the present method uses information from sensors, estimates flow parameters, predicts required flow parameters to achieve the desired force and provides actuation signals and a discrete-time difference equation model to address the relationship between pressure in the cylinder and the motion of the piston.

In a preferred form, the present invention provides a method and system that estimate effective flow parameters based on sensor measurements, predict desired flow parameters for force control objectives and determine required control actuation signals, for differentiation from existing methods.

One embodiment of the invention resides in a method for achieving force control in hydraulic/gas-filled cylinders driven by external mechanisms with unknown parameters, wherein a fluid enters said cylinders through flow area of flow ports, comprising the steps of: estimating values of effective flow-area controlled by flow regulating actuators at known time intervals using measurements from sensors; predicting a desired effective flow area at each of said time intervals based on desired control parameters including desired force level requirements; computing differences between estimated flow area and predicted desired effective flow area as error signals; and, using said error signals to generate actuator signals and using said actuator signals selectively for driving said flow regulating actuators. Expediently, the method includes step of storing and handling digitized estimated effective flow area and digitized predicted desired effective flow area and said error signals in a digital processor for generating actuating control signals. The actuating control signals are used as flow regulating control signals. Additionally, the method may use the step of selectively using measured manifold pressures in the hydraulic cylinders as well as measured piston displacement and velocity as added inputs in generating the actuating control signals. In a modification, the invention includes the steps of constructing a multiplicity of controller parameter vectors, and creating a multiplicity of data vectors, and, revising said controller parameter vectors using an update law, as well as said data vectors and said error signals. Further, the modification may include the step of calculating a plurality of control signals based on said controller parameter vectors and said data vectors.

A second embodiment of the invention resides in a system for achieving force control in hydraulic/gas-filled cylinders driven by external mechanisms with unknown parameters, wherein a fluid enters said cylinders through flow area of flow ports, comprising: means for estimating value of effective flow-area controlled by flow regulating actuators at known time intervals using measurements from sensors; means for predicting a desired effective flow area at each of said time intervals based on desired control parameters including desired force level requirements; a processor configured for computing differences between estimated flow area and predicted desired effective flow area as error signals; and, means using said error signals to generate actuator signals and using said actuator signals selectively for driving said flow regulating actuators.

In another form, the method and system for achieving such force control may comprise pressure sensors to measure the pressure of hydraulic fluid in each cylinder, one or more displacement sensors to measure the displacement of the piston in each hydraulic cylinder, piston velocity sensors or piston velocity estimators, manifold pressure sensors or manifold pressure estimators, converters that digitize analog signals from the sensors, a microprocessor capable of storing data from the converters and performing required calculations, converters that create actuation signals from the computations of the microprocessor, and actuators that regulate the flow of hydraulic fluid out of each cylinder by changing the effective flow-area of flow ports, including but not limited to servo-valves, proportional valves and servo-proportional valves.

The invention also covers programmed articles comprising a storage medium having instructions thereon which when executed by a computing platform would result in execution of a method and system as described herein.

BRIEF DESCRIPTION OF THE DRAWINGS

A more detailed understanding of the invention may be had from the following description of embodiments, given by way of example and to be understood in conjunction with the accompanying drawing wherein like reference characters refer to like elements throughout the several views where applicable, in which.

DESCRIPTION OF EMBODIMENTS

In the following detailed description of the various embodiments of the invention, reference is made to the accompanying drawings that form a part hereof, and in which are shown by way of illustration, specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is therefore not to be taken in a limiting sense, and the scope of the present invention is defined only by the appended claims and their equivalents.

Figure 1:
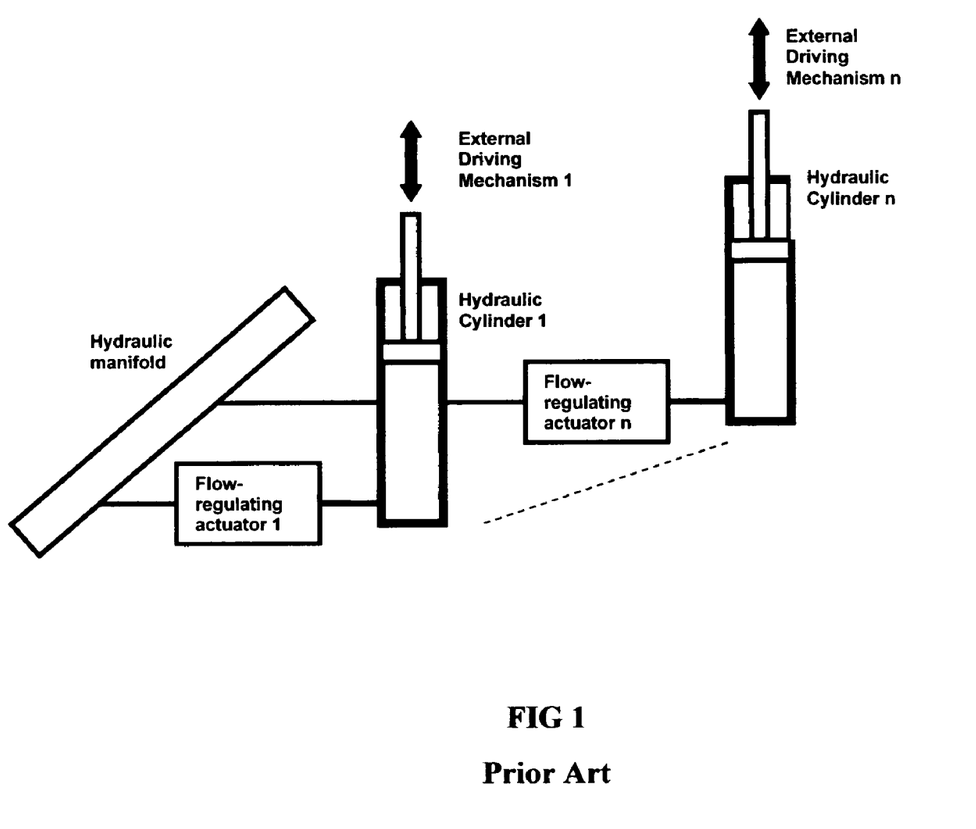
FIG. 1 illustrates a graphical representation of the system to be controlled according to an embodiment of the invention.

FIG. 1 shows a graphical representation of a system of hydraulic cylinders to be controlled according to an embodiment of the invention. As shown, the system is only an example and includes external driving mechanisms 1 to n which actuate respective cylinders that receive hydraulic fluid from a hydraulic manifold, as controlled by a plurality of flow regulating actuators 1 to n. The system illustrated has application in sheet metal stamping operations. FIG. 2 illustrates a hydraulic cylinder which is actuated by a tire, and shows a flow regulating actuator admitting controlled fluid into the hydraulic cylinder. A typical application of this configuration is an automobile shock absorber. FIG. 3 generally and diagrammatically illustrates a press ram which suitably shapes a sheet metal blank as assisted by a hydraulic cylinder actuated by a flow regulating actuator.

Figure 4:
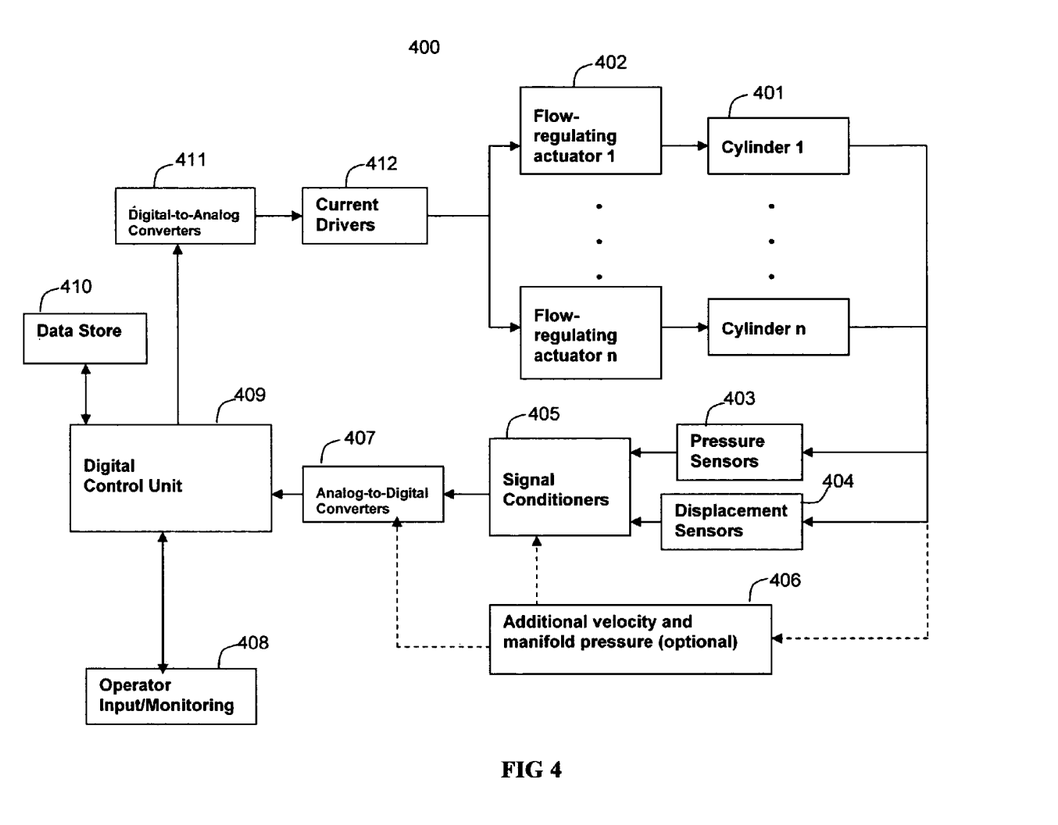
FIG. 4 illustrates a graphical representation of the system according to one embodiment of the invention.

FIG. 4 shows a schematic block diagram embodying the principles of one form of the invention. As shown, cylinders 401 (1 to n) admit hydraulic fluid as controlled by flow regulating actuators 402 (1 to n). The described embodiment uses pressure sensors 406, which may be any suitable type of pressure sensors for the purpose. Signals from all the sensors are passed through signal conditioners 405 to render the signals suitable for further processing the conditioned signals are preferably converted to digital form in A/D converters 407 and transmitted to digital control unit 409. An operator input/monitoring unit 408 provides inputs and information to the digital control unit 409 which in turn communicates on a two way basis with data store 410 the data store 410 may comprise one or more forms of storage including storage means chosen from a group consisting of read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like, including chemical storage, biological storage, and other types of data storage. The digital control unit 409 may take the form of a microprocessor and performs operations including but not limited to processing signals corresponding to measured hydraulic cylinder pressures, measured piston displacements, measured piston velocity, measured manifold pressure, as well as perform computations of estimated and predicted flow areas. Actuator signals are generated in digital form by the digital control unit 409 and sent to D/A converter 411 for implementation through current drivers that control flow control actuators 402. The flow control actuators 402 in turn regulate fluid flow in cylinders 401 to achieve force control as desired, regardless of parameters of the drivers of the hydraulic cylinders being unknown.

Described hereinafter are exemplary computational details in the improved system for achieving force control in hydraulic cylinders driven by external mechanisms with unknown parameters, wherein a fluid enters said cylinders through flow area of flow ports.

The discrete-time relationship between the fluid pressure $P_k^i$ in the ith hydraulic cylinder at time instant k is given by:

$$P_k^i = P_{k-1}^i + \frac{\Delta t \beta}{V_0^i - A^i d_{k-1}^i} \left[ A^i \dot{d}_{k-1}^i - A_{v,k-1}^i \sqrt{\frac{2(P_{k-1}^i - P_{m,k-1}^i)}{\rho}} \right], \quad (1)$$

where $\Delta t$ is the sampling period, $\beta$ is the bulk-modulus of the hydraulic fluid, $A^i$ is the cross-sectional area of the piston of the ith hydraulic cylinder, $d_{k-1}^i$ is the displacement of the piston of the ith hydraulic cylinder from its fully extended position at time instant k−1, $\dot{d}_{k-1}^i$ is the velocity of the piston of the ith cylinder at time instant k−1, $A_{v,k-1}^i$ is the effective flow-rate area of the flow-regulating actuator for the ith cylinder at time instant k−1, $P_{m,k-1}^i$ is the outflow manifold pressure for the ith cylinder at time instant k−1, $V_0^i$ is the volume of fluid between the piston of the ith cylinder and the flow-regulating actuator when the piston is fully extended, and $\rho$ is the density of the hydraulic fluid.

From equation (1), it follows that $A_{v,k-1}^i$ can be estimated as $$A_{v,k-1}^i = \sqrt{\frac{\rho}{2(P_{k-1}^i - P_{m,k-1}^i)}} \left[ A^i \dot{d}_{k-1}^i - \left( \frac{P_k^i - P_{k-1}^i}{\Delta t \beta} \right)(V_0^i - A^i d_{k-1}^i) \right], \quad (2)$$

using sensor measurements of $P_k^i$, $d_k^i$, estimates or sensor measurements of $\dot{d}_k^i$ and $P_{m,k}^i$ at every time step k, knowledge of the geometric properties of the hydraulic cylinder ($A^i$ and $V_0^i$) and knowledge of the material properties of the hydraulic fluid ($\beta$ and $\rho$). All quantities required for the calculation of $A_{v,k-1}^i$ from equation (2) are readily available from sensor measurements and data sheets. They do not have to be changed for a given hydraulic system, even if it is reconfigured with an external driving mechanism.

The desired pressure $P_{r,k+1}^i$ in the hydraulic cylinder at the next time-step, is determined based on the desired force $F_{r,k+1}^i$ required at the next time-step, from the equation:

$$P_{r,k+1}^i = \frac{F_{r,k+1}^i}{A^i}, \quad (3)$$

Then the desired effective flow-rate area, $A_{vd,k+1}^i$ at the next time-step is calculated as $$A_{vd,k+1}^i = \sqrt{\frac{\rho}{2(P_k^i - P_{m,k}^i)}} \left[ A^i \dot{d}_k^i - \mu \left( \frac{P_{r,k+1}^i - P_k^i}{\Delta t \beta} \right)(V_0^i - A^i d_k^i) \right], \quad (4)$$

where $\mu$ is a factor between 0 and 1 that accounts for the responsiveness of the flow-regulating actuator. As in equation (2), all quantities required to calculate $A_{vd,k+1}^i$ from equation (4) are known from measurements and hydraulic system data sheets and are independent of the external driving mechanism. $F_{r,k+1}^i$ is an a priori known quantity as per the desired objective of the force control system.

The next step is to generate an actuation signal, $u_k^i$ to the flow-regulating actuator to create the desired effective flow-area, $A_{vd,k+1}^i$. The relationship between the effective flow-area $A_{v,k}^i$ of the flow-regulating actuator at time step k, and the actuation signal $u_k^i$, is modeled using an n-th order autoregressive moving average (ARMA) model (as per the publication G. F. Franklin, J. D. Powell and M. L. Workman, *Digital Control of Dynamic Systems*, second edition, Reading, Mass.: Addsion-Wesley, 1990.) as $$A_{v,k+1}^i = \alpha_0^i A_{v,k}^i + \alpha_1^i A_{v,k-1}^i + \ldots + \alpha_{n-1}^i A_{v,k-n+1}^i + \gamma_0^i u_k^i + \gamma_1^i u_{k-1}^i + \ldots \gamma_{n-1}^i u_{k-n+1}^i, \quad (5)$$

which can be rewritten as $$A_{v,k+1}^i = \bar{\chi}^i \phi_{1,k}^i + \gamma_0^i u_k^i, \quad (6)$$

where $\bar{\chi}^i$ and $\phi_{1,k}^i$ are defined as follows $$\bar{\chi}^i \triangleq [\alpha_0^i \ldots \alpha_{n-1}^i \ \gamma_0^i \ldots \gamma_{n-1}^i], \quad \phi_{1,k}^i \triangleq \begin{bmatrix} A_{v,k}^i \\ \vdots \\ A_{v,k-n+1}^i \\ u_{k-1}^i \\ \vdots \\ u_{k-n+1}^i \end{bmatrix}. \quad (7)$$

Also, the predicted flow-rate error is defined as $$\varepsilon_{k+1}^i \triangleq A_{vd,k+1}^i - A_{v,k+1}^i \quad (8)$$

and, the actuator signal at time step k is calculated as $$u_k^i = \theta_k^i \phi_{2,k}^i \quad (9)$$

where $\theta_k^i$ is a controller parameter vector of length $n_c^i$ updated by a gradient update law $$\theta_{k+1}^i = \theta_k^i - \eta_k^i \frac{\partial J_k^i}{\partial \theta_k^i}, \quad (10)$$

with the cost function $$J_{k+1}^i \triangleq \frac{1}{2}(\varepsilon_{k+1}^i)^2$$

and with the step-size $\eta_k^i$ having the same geometrical interpretation as in published U.S. Pat. No. 6,208,739 granted in March 2001 to Venugopal et al, that is, the controller parameters get closer to an optimal controller parameter vector that minimizes the cost function after each update. The control data vector $\phi_{2,k}^i$ is defined as $$\phi_{2,k}^i \triangleq \begin{bmatrix} u_{k-1}^i \\ \vdots \\ u_{k-n_c}^i \\ A_{v,k-1}^i \\ \vdots \\ A_{v,k-n_c}^i \end{bmatrix}.$$

It is noted that the update of the controller parameter vector using equation (10) and the calculation of the actuation signal using (9) do not involve the characteristics of the external driving mechanism. The control data vector is constructed from known past estimates of the effective flow area and past actuation signal values.

The computational details provided above are for the example of a hydraulic system whereas, for pneumatic/gas-filled systems an equivalent derivation and equations that account for density and temperature variations, including suitable parameters may be used.

Figure 5:
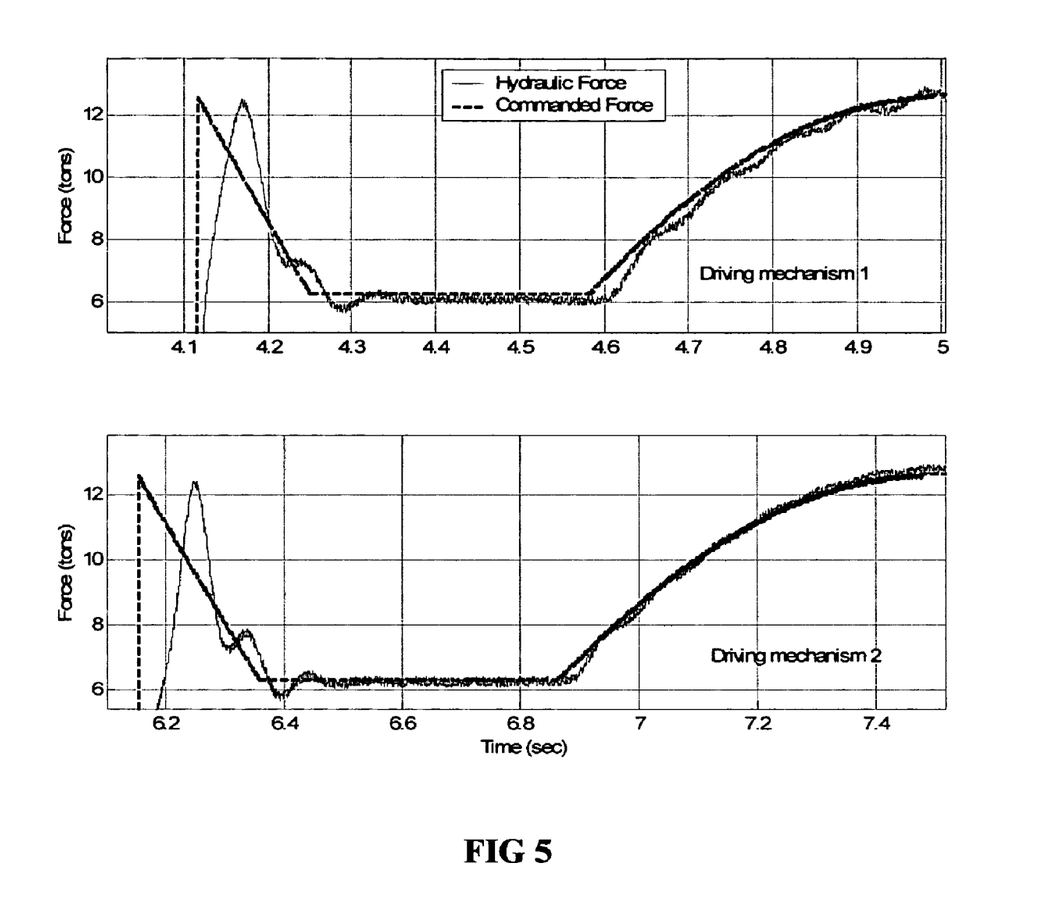
FIG. 5 illustrates the simulation results of the system applied to a mechanical stamping press with two different drive-configurations as examples.

Simulation results of the use of an embodiment of the invention are presented in FIG. 5 for force control of a single hydraulic cylinder driven by the crank-drive mechanism of a mechanical stamping press as shown in FIG. 3. In the illustrated example, the cylinder piston is assumed to have a cross-sectional diameter of 4", a length of 10" and an active stroke of 8". The flow-regulating actuator is assumed to be a servo-valve rated at 60 gallons/min at a pressure drop of 1000 PSI with a 3 dB frequency response roll-off at 70 Hz. Two different simulations were conducted to show that the described embodiment of the invention provides accurate force control for three different external drive configurations: in the first configuration, the crank drive rotates at 8 RPM with a linkage length of 75" and in the second, the crank drive rotates at 12 RPM with a linkage length of 60". The top plot of FIG. 5 represents the first configuration, while the bottom plot represents the second. The dashed line in the plots represents the desired force level while the solid line shows the force level obtained using the embodiment of the invention as time progresses.

In contrast to and as an improvement over prior art, the present method includes at least three innovative features. The first is the estimation of effective flow-area of the flow-regulating actuators at each time-step using measurements from pressure, displacement and optional velocity sensors and information about the geometry and material properties of the hydraulic system.

The second innovative feature is the prediction of a desired effective flow-rate area at each time-step based on desired force-level requirements, sensor measurements and flow-regulating actuator responsiveness.

The third innovative feature is using an update for the controller parameter vector used to calculate the actuator signal and each time-step based on the error between the desired effective flow-rate area and the estimated flow-rate area. While methods described in aforesaid references (the publication by S. Ananthakrishnan, S. Agrawal, R. Venugopal, M. Demeri, titled "RCS Based Hardware-in-the-loop Intelligent System Design and Performance Measurement," *Proceedings of PerMIS* 2002, NIST, Gaithersburg, Md. 2002; U.S. Pat. No. 6,732,033 of May 2004 to Laplate et al; and the publication by C. Mo and M. Sunwoo, titled "A Semiactive Vibration Absorber (SAVA) for Automotive Suspensions," *Int. J. of Vehicle Design*, pp. 83-95, Vol. 29, Nos. 1/2, 2002) all have controller parameters adjusted for the dynamics of the external driving mechanism, the controller parameters are independent of the driving mechanism in the present inventive method.

The system described hereinabove is by way of example only and not as a limitation, and advantageously comprises: means for regulating flow out of a multiplicity of hydraulic cylinders to a manifold; means for measuring pressures in a multiplicity of hydraulic cylinders; means for measuring the displacement of the pistons in a multiplicity of hydraulic cylinders; means for estimating or measuring the velocity of the pistons in a multiplicity of hydraulic cylinders; means of estimating or measuring manifold pressure in a system of externally driven hydraulic cylinders; means for converting measurements and estimates to a digital form; means for storing the digital form of the measurements and estimates; means for performing calculations using the stored digital form of measurements and estimates, the means for performing calculations calculating estimated flow areas and predicted flow areas; means for converting the estimated and predicted flow areas into at least one actuation signal; and means for driving said flow regulating actuators according to the at least one actuating signal. The various means referred to above may be sensors/transducers well known in the art for accomplishing the desired purpose, and could take the form of alternative measuring means for measuring pressure, displacement, velocity, and other means for storing data, and making the desired computations.

Having described the embodiments, many modifications to the means of measurement of parameters and the means for digitally computing the required flow area in the form of control signals, will become apparent to those skilled in the art, without deviation from the spirit of the invention.

A general computing device 600 uses a computer 610 which may include a processing unit 602, memory 604, interacting with removable storage 612, and non-removable storage 614. Computer 610 additionally includes a bus 605 and a network interface (NI) 601.

Computer 610 may include or have access to a computing environment that includes one or more user input devices 616, one or more output modules or devices 618, and one or more communication connections 620 such as a network interface card or a USB connection. The one or more user input devices 616 can be a touch screen and a stylus and the like. The one or more output devices 618 can be a display device of computer, computer monitor, TV screen, plasma display, LCD display, display on a touch screen, display on an electronic tablet, and the like. The computer 610 may operate in a networked environment using the communication connection 620 to connect to one or more remote computers. A remote computer may include a personal computer, server, router, network PC, a peer device or other network node, and/or the like. The communication connection may include a Local Area Network (LAN), a Wide Area Network (WAN), and/or other networks.

Computer 610 may include or have access to a computing environment that includes one or more user input devices 616, one or more output modules or devices 618, and one or more communication connections 620 such as a network interface card or a USB connection. The one or more user input devices 616 can be a touch screen and a stylus and the like. The one or more output devices 618 can be a display device of computer, computer monitor, TV screen, plasma display, LCD display, display on a touch screen, display on an electronic tablet, and the like. The computer 610 may operate in a networked environment using the communication connection 620 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 604 may include volatile memory 606 and non-volatile memory 608. A variety of computer-readable media may be stored in and accessed from the memory elements of computer 610, such as volatile memory 606 and non-volatile memory 608, removable storage 612 and non-removable storage 614. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like, including chemical storage, biological storage, and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures and application programs, for performing tasks, or defining abstract data types or low-level hardware contexts, using machine readable instruction stored on a selected one of different types of storage media.

Machine-readable instructions stored on any of the above-mentioned storage media are executable by the processing unit 602 of the computer. For example, a computer program may include machine-readable instructions capable of enabling measurement of piston velocity, pressure and displacement, and digitally projecting a required flow-area based on constructed parameter vectors, according to the teachings of the described embodiments of the present subject matter. In one embodiment, the computer program may be included on a CD-ROM and loaded from the CD-ROM to a hard drive in a non-volatile memory. The machine-readable instructions cause the computer to decode according to the various embodiments of the present subject matter.

The foregoing is the description of exemplary implementations of the method and apparatus for achieving force control in externally driven hydraulic/gas-filled systems in which the characteristics of the driving mechanism are not known. The disclosed method and system are applicable to a wide class of force control problems in systems with variable flow rates induced by external mechanisms, including but not limited to hydraulic and gas-filled cylinders. The description hereinabove is intended to be illustrative, and not restrictive.

The various embodiments of the improved digitized force control system described herein are applicable generally to any force control system using cylinders, and the embodiments described herein are in no way intended to limit the applicability of the invention. In addition, the techniques of the various exemplary embodiments are useful to the design of any hardware implementations of software, firmware, and algorithms in the context of achieving force control in hydraulic or gas-filled cylinders in general. Many other embodiments within the ambit of the invention will be apparent to those skilled in the art. The scope of this invention should therefore be determined by the appended claims as supported by the text, along with the full scope of equivalents to which such claims are entitled.

The invention claimed is:

1. A method of achieving force control in hydraulic/gas-filled cylinders driven by external mechanisms with unknown parameters, wherein a fluid enters said cylinders through flow area of flow ports under control of flow regulating actuators, comprising the steps of:

estimating values of a multiplicity of effective flow areas to characterize flow of fluid out of said cylinders at known time intervals;

predicting a desired effective flow area at each of said time intervals based on desired control parameters including desired force level requirements;

computing differences between estimated flow area and predicted desired effective flow area as error signals; and, using said error signals to generate actuator signals, and using said actuator signals selectively for driving said flow regulating actuators.

2. The method of claim 1, including the steps of:
constructing a multiplicity of controller parameter vectors, and creating a multiplicity of data vectors; and,
revising said controller parameter vectors using an update law and said data vectors and said error signals.

3. The method of claim 2, including the step of calculating a plurality of control signals based on said controller parameter vectors and said data vectors, as well as measurements from sensors.

4. The method as in claim 2, including the step of digitizing said estimated effective flow area and said predicted desired effective flow area and said error signals for digital processing.

5. The method as in claim 4 including the step of storing and handling said digitized estimated effective flow area and said predicted desired effective flow area and said error signals in a digital processor for generating said actuator signals.

6. The method as in claim 5, wherein said actuator signals comprise flow regulating control signals.

7. The method as in claim 5, wherein the cylinders comprise hydraulic cylinders, including the step of using measured manifold pressures in said hydraulic cylinders as an added input in generating said actuator signals.

8. The method as in claim 7 including the step of using measured piston displacement in said hydraulic cylinders as an added input in generating said actuator signals through said processor.

9. The method as in claim 7, including the step of using measured piston velocity in said hydraulic cylinders as an added input in generating said actuator signals through said processor.

10. The method as in claim 7, wherein said hydraulic cylinders form part of a hydraulic system, including the step of using information relating to material properties and geometry of said hydraulic system.

11. A computer readable medium encoded with instructions capable of being executed by a computer program with program instructions stored in the computer readable medium for execution of a method for achieving force control in gas-filled/hydraulic cylinders driven by external mechanisms with unknown parameters, wherein a fluid enters said cylinders through flow area of flow ports under control of flow regulating actuators, comprising the steps of:

estimating value of a multiplicity of effective flow-areas to characterize flow of hydraulic fluid out of said hydraulic cylinders at known time intervals;

predicting a desired effective flow area at each of said time intervals based on desired control parameters including desired force level requirements;

computing a differences between estimated flow area and predicted desired effective flow area as error signals; and, using said error signals to generate actuator signals, and using said actuator signals selectively for driving said flow regulating actuators.

* * * * *